Oct. 27, 1970     S. T. DEAKIN     3,536,896
CARD READER FOR SENSING HOLES IN PUNCHED CARDS
Filed May 18, 1967     3 Sheets-Sheet 1
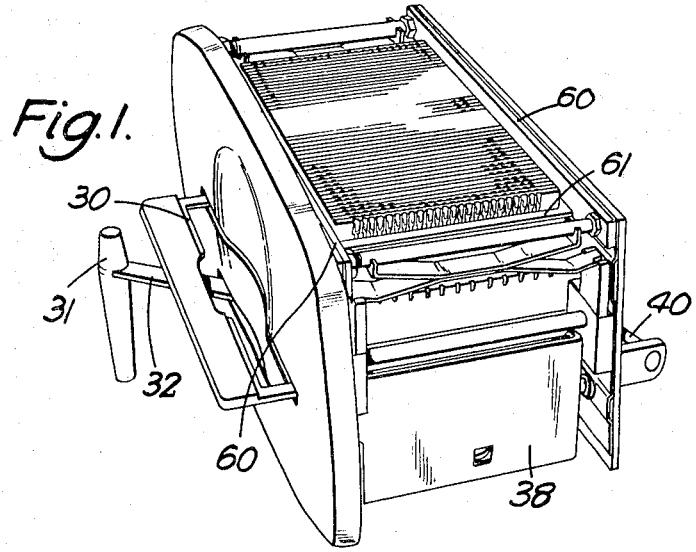
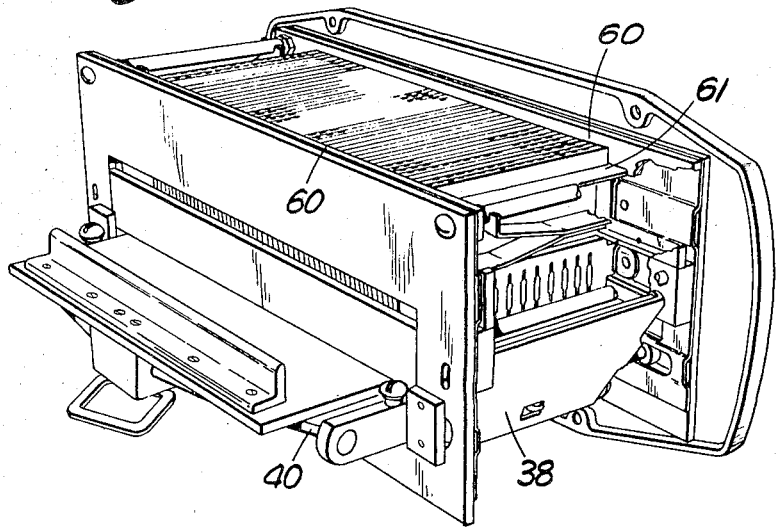
*INVENTOR*
STANLEY THOMAS DEAKIN
BY
*Robertson, Bryan, Parmelee & Johnson*
*ATTORNEYS.*

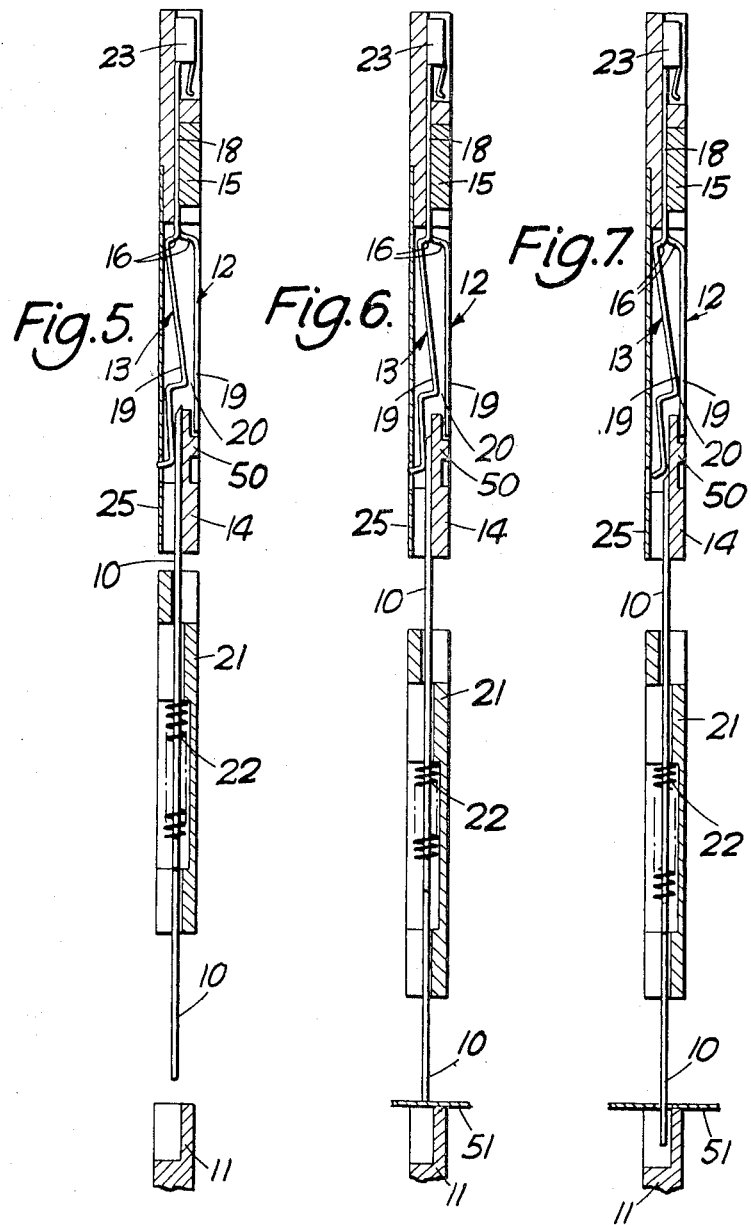

United States Patent Office 3,536,896
Patented Oct. 27, 1970

3,536,896
CARD READER FOR SENSING HOLES IN PUNCHED CARDS
Stanley Thomas Deakin, Farlington, England, assignor to Sealectro Limited, Farlington, England, a British company
Filed May 18, 1967, Ser. No. 639,561
Claims priority, application Great Britain, May 20, 1966, 22,672/66
Int. Cl. G06k 7/04; H01h 43/08
U.S. Cl. 235—61.11                    2 Claims

ABSTRACT OF THE DISCLOSURE

A device for sensing the holes in a punched card which device has a multiplicity of sensing pins and, for each pin, a pair of electrical contact blades extending in the lengthwise direction of the pin and relatively movable into and out of contact transversely of the length of the pin, said contacts being held in spaced relation by the associated pin if the pin is arrested by a card and, in the case of the pin sensing a hole, the contacts are allowed to engage each other whereby an electrical circuit may be connected.

---

This invention relates to devices for sensing the holes in punched cards or webs (hereinafter called cards), and in particular to such devices having one or more sensing pins. The number of sensing pins provided usually depends on the number of possible places in which the card may be punched.

According to the invention a device for sensing the holes in a punched card comprises a support for a card to be sensed, a multiplicity of sensing pins arranged in parallel side-by-side relation and guided for lengthwise movement towards and away from the support, means for moving the pins towards the support which means permit the movement of pins which engage a card on the support to be arrested by the card while the movement of the pins which sense the holes is continued, means for effecting the return movement of each pin away from the support, and, for each pin, a pair of electrical contact blades extending in the lengthwise direction of the pin and relatively movable into and out of contact transversely of the length of the pin, said contacts being biassed into engagement and hence electrical connection with each other and being held in spaced relation by the associated pin if the pin is arrested by the card, which contacts, in the case of the associated pin sensing a hole in the card, are allowed to engage each other whereby an electrical circuit may be connected.

Preferably one contact of each pair of contacts is biassed to engage the other contact at a point intermediate the ends of the said one contact and a member is located face-to-face with that end of the said one contact which is located between the engagement point of the two contacts and the card support, the associated pin being insertable between the said one contact and the said member to disengage the contacts. It is also preferred that the engagement point of the contacts is intermediate the ends of both the contacts and the said member is an insulating member located between adjacent parts of the contacts and between the said engagement point and the card support.

Preferably the means for moving the pins towards the support comprises holders movable towards and away from the support, the pins being movable lengthwise in the holders and spring-urged therein towards the support.

Each contact may be provided with a socket portion whereby it may be connected to an external electrical circuit.

It is further preferred that there is provided an arrangement in which the contact pairs are arranged in rows and each row is supported on a moulded plate, said plate having for each contact pair of the row, a slot or groove which is forked at one end to provide two parallel grooves leading to one of a pair of opposed edges of the plate, in which the contacts are of resilient strip metal, are in face-to-face relation in the body of the slot or groove, are oppositely cranked laterally of the strip and reduced in width to lie in the two parallel grooves respectively, the portions of the contacts nearest the edge of the plate being bent to socket form, in which the contacts are held in place by a strip of material bridging the parallel grooves, in which adjacent the other of the opposed edges of the plate, there is for each pair of contacts a lip on the plate which enters between the contacts, in which the contacts are shaped and biassed to engage each other within the body of the slot or groove and in which at the said other opposed edge there is for each contact pair of guideway for a pin to enter in the lengthwise direction of the contact strips between one of the contacts and said lip thereby to effect separation of the contacts.

By way of example, a specific construction of card sensing device in accordance with the invention will now be described with reference to the accompanying drawings in which:

FIG. 1 is a perspective view of the front and one end of the card sensing device, the card tray of the device being in its open position;

FIG. 2 is a perspective view of the back and one end of the card sensing device shown in FIG. 1, the end being the other end from that shown in FIG. 1 and the card tray being in its closed position;

FIG. 5 is a section along line 5—5 in FIG. 3, the sensing pin being in its initial position;

FIG. 6 is a similar view to FIG. 5 with the downward movement of the pin being arrested by a card being sensed; and FIG. 7 is a similar view of FIG. 5, the sensing pin being in its furthest downward position and having sensed a hole in a card being sensed.

Figure 3:
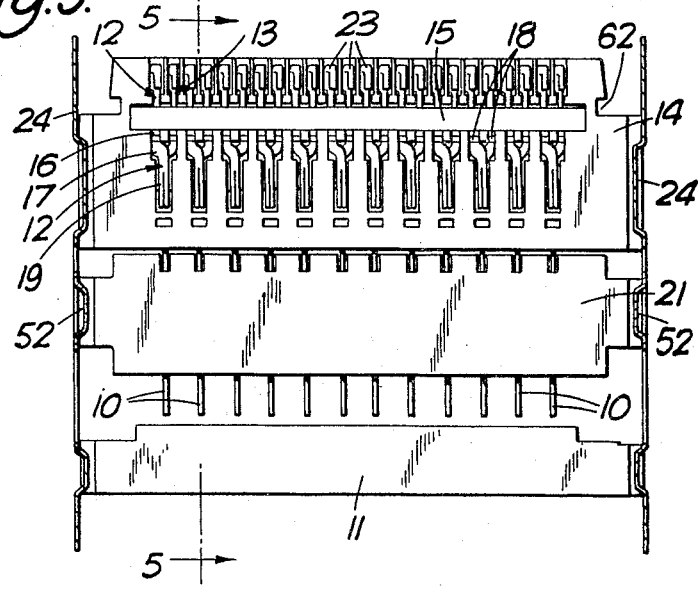
FIG. 3 is a view of the sensing pins and their associated contacts and mouldings forming one of the rows of sensing pins of the card sensing device shown in FIGS. 1 and 2.

With reference to the drawings, the card sensing device comprises means for sensing any permutation of holes in a punched card and is provided with 960 sensing pins 10 arranged in eighty rows, each row containing twelve pins. The pins may be made of metal or may be made of non-electrically conductive material, (e.g. plastic). The pins are also located between a card support, which is made up of 80 separate mouldings 11, one for each row, and pairs of associated contacts 12, 13 which are held within sockets of other mouldings 14 by means of strips 15 of insulating material which are bonded by adhesive to the respective moulding 14. The two contacts 12, 13 are each formed from flexible strip matreial and are bent at 16 at right angles to the length of the strip and at 17 in the plane of the strip, both the bending points 16, 17 being near the centre of the length of the strip. Such deformation of the contacts results in contacts which have their top sections 18 lying side-by-side in the same vertical plane and their lower sections 19 lying face-to-face in separate vertical planes. The top end of each pin is also provided with sidewardly projecting extensions which are bent into the form of a socket 23, the sockets of each pair of contacts 12, 13 thereby forming a pair of terminals for an electrical circuit. The lower section 19 of each contact is also further bent so that the bottom ends of each pair of contacts 12, 13 lie on opposite sides of a crossbar 50 of the moulding 14 (see especially FIGS. 5 to 7) and yet the flexibility of the lower sections is such that they are biassed to engage each other at 20 to provide an electrical connection therebetween. The lower section 19 of each contact 12 is also split in two to provide two points of engagement with the contact 13. The provision of the crossbar 50 for each pair of contacts 12, 13 allows the engagement force of the contacts to be predetermined and to be independent of the degree with which the contacts are biassed towards each other.

The pins are mounted in mouldings 21 and are downwardly urged, i.e. away from the contacts 12, 13 and towards the card support mouldings 11 by individual springs 22. The top end of each pin, when in its initial or raised position, is also located between the lower section of the contact 13 and the adjacent surface of the crossbar 50 of the moulding 14 and the thickness of the pin is sufficient to deflect the contact 13 out of engagement with its contact 12. In operation, the pin mouldings 21 are moved downwardly towards the card support mouldings 11 thereby tending to withdraw the pins lengthwise away from their contacts. At the end of the downward movement of the pin mouldings 21, the pins which sense a hole in a card 51 being sensed will have passed through their respective holes and will have allowed their associated contacts to engage each other at 20. However, each pin which does not sense a hole will continue to deflect its associated contact 13 out of engagement with its contact 12. The result of the operation is that only the pairs of contacts which correspond to the pins that have sensed a hole will engage each other at 20 and so complete their respective electrical circuits. Upward movement of the pin mouldings 11 will return the pins to their initial or raised position (see FIG. 5) and thereby effect separation of all the pairs of contacts 12, 13, the insertion of the top end of each pin between its associated contact 13 and crossbar 50 of the moulding 14 being assisted by that end of the pin being wedge-shaped.

For convenience in the connecting of the sockets or terminals 23 to the respective electrical circuits, one socket of each pair of contacts in each row may be connected together by means of a busbar (not shown). Alternatively, the busbar may be used to connect one socket of a pair of contacts in one of the rows with one socket of a pair of contacts in another row. The busbar is thereby located externally of the device which increases the flexibility of the manner in which the contacts may be connected to electrical circuits.

Figure 4:
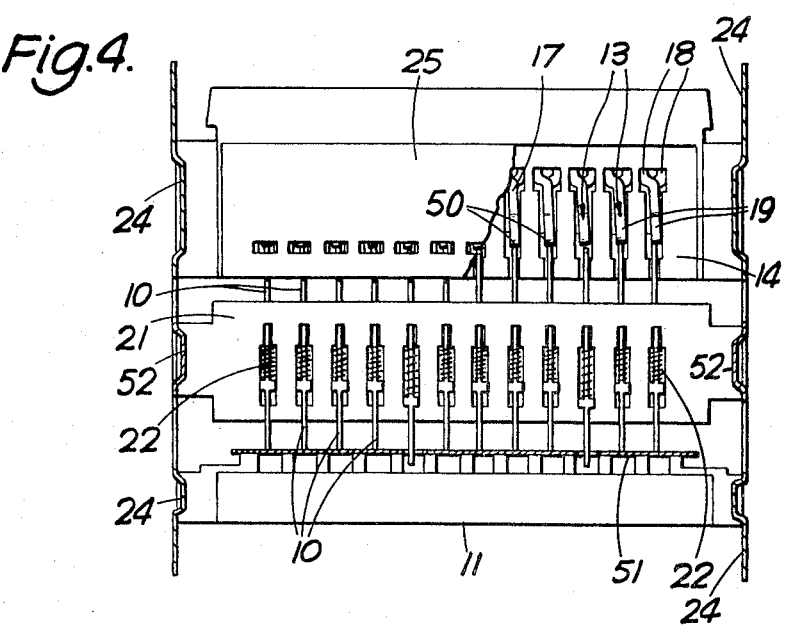
FIG. 4 is a view similar to FIG. 3 but showing the other side of the pins and their associated contacts and mouldings.

The aforesaid mouldings 14, 11 are held upright and in proper relation one with the other by means of two side plates 24, each of which extends the full length of the device and is provided with rows of slots for reception of the mouldings 14, 11. The intermediate mouldings 21 are located by further side plates 52, which further side plates are movable up and down together with the mouldings 21 by means which is described below. Sheets 25 of insulating material (see FIG. 4) are provided between the mouldings 14 to insulate each row of contacts 12, 13 from the adjacent row or rows of contacts.

The card to be sensed is inserted into and removed from the card reader by a card tray 30. This card tray is movable between open and closed positions by a handle 31 on the end of a lever 32. Constructions of such card trays are known and thus this particular construction, which achieves the same result, will not be described in detail. In FIG. 1, the card tray is shown in its open position and in FIG. 2, the card tray is shown in its closed position, the card thereon then being in a position in which it can be sensed. As is usual, means are provided to preclude inward movement of the card tray, i.e. movement of the card tray towards its closed position, unless a card has been inserted both fully and in a predetermined manner, the means being operative by a chamfered corner of the card.

Assuming a card to be sensed has been fully and correctly inserted into the card tray 30, rotation of the lever 32 will cause inward movement of the card tray. Such inward movement will effect pivotal movement of end plates 38 and swivelling movement of rods 40 connected at one end to the card tray. These rods 40 are also connected by a spring 44 which as soon as it passes overcentre will accelerate the inward movement of the card tray to its closed position. Further rotation of the handle will, by means of the side plates 38, lower the pin mouldings 21 and allow the pins 10 to sense the holes in the card.

Reverse rotation of the lever 32 by the handle 31 will first raise the pin mouldings, hence releasing the card being sensed from the pins and disengaging each of the pairs of contacts that were in engagement, and then effect movement of the tray from its closed position to its open position. The card that has been sensed may then be removed and the operation repeated in respect of a further card.

With reference to FIGS. 1 and 2, any one of the mouldings 14 and the contacts mounted therein may be removed from the device after disconnection of the retaining bars 60. To assist the removal of one of these mouldings, a tool 61 is provided which when turned upwardly through 90°, may be slid along the row of mouldings to the one which it is required to remove and then raised upwardly together with the moulding, the tool having end lugs which engage in recesses 62 (see FIGS. 3 and 4) in the moulding.

I claim:

1. A device for sensing the holes in a punched card comprising a support for a card to be sensed, a multiplicity of sensing pins arranged in parallel side-by-side relation and guided for lengthwise movement towards and away from the support, means for moving the pins towards the support which means permit the movement of pins which engage a card on the support to be arrested by the card while the movement of the pins which sense the holes is continued, means for effecting the return movement of each pin away from the support, and, for each pin, a pair of electrical contact blades extending in the lengthwise direction of the pin and relative movable into and out of contact transversely of the length of the pin, said contacts being biassed into engagement and hence electrical connection with each other and being held in spaced relation by the associated pin if the pin is arrested by the card, which contacts, in the case of the associated pin sensing a hole in the card, are allowed to engage each other whereby an electrical circuit may be connected, and said pairs of contacts are arranged in rows and each row is supported on a moulded plate, said plate having for each contact pair of the row, a slot or groove which is forked at one end to provide two parallel grooves leading to one of a pair of opposed edges of the plate, in which the contacts are of resilient strip metal, are in face-to-face relation in the body of the slot or groove, are oppositely cranked laterally of the strip and reduced in width to lie in the two parallel grooves respectively, the portions of the contacts nearest the edge of the plate being bent to socket form, in which the contacts are held in place by a strip of material bridging the parallel grooves, in which adjacent the other of the opposed edges of the plate, there is for each pair of contacts a lip on the plate which enters between the contacts, in which the contacts are shaped and biassed to engage each other within the body of the slot or groove and in which at the said other opposed edge there is for each contact pair a guideway for a pin to enter in the lengthwise direction of the contact strips between one of the contacts and said lip thereby to effect separation of the contacts.

2. A device as claimed in claim 1 in which the bridging strip aforesaid is held by adhesive to the plate.

References Cited

UNITED STATES PATENTS

| | | |
|---|---|---|
| 3,294,957 | 12/1966 | Young. |
| 3,352,981 | 11/1967 | Ekers _____ 200—46 |
| 296,812 | 4/1884 | Blake _____ 200—153 |
| 2,372,882 | 4/1945 | Daly et al. |

MAYNARD R. WILBUR, Primary Examiner

T. J. SLOYON, Assistant Examiner

U.S. Cl. X.R.

200—46